United States Patent [19]
Rosenbaum et al.

[11] Patent Number: 5,285,485
[45] Date of Patent: Feb. 8, 1994

[54] COMPOSITE NUCLEAR FUEL CONTAINER AND METHOD FOR PRODUCING SAME

[75] Inventors: Herman S. Rosenbaum; Ronald B. Adamson, both of Fremont; Bo C. Cheng, Cupertino, all of Calif.

[73] Assignee: General Electric Company, San Jose, Calif.

[21] Appl. No.: 11,559

[22] Filed: Feb. 1, 1993

[51] Int. Cl.$^5$ .............................. G21C 3/20
[52] U.S. Cl. ...................... 376/261; 376/417; 148/672
[58] Field of Search ............ 376/260, 261, 417, 457; 148/421, 672; 420/422; 29/906

[56] References Cited

U.S. PATENT DOCUMENTS

| | | |
|---|---|---|
| 4,390,497 | 6/1983 | Rosenbaum et al. ............... 376/417 |
| 4,664,727 | 5/1987 | Inagaki et al. ...................... 420/422 |
| 5,223,206 | 6/1993 | Rosenbaum .......................... 376/417 |

OTHER PUBLICATIONS

"Mechanistic Studies of Zircaloy Nodular Corrosion", Cheng et al, ASTM 939, pp. 387–416, 1987.
"An oxide-semiconductance model of nodular corrosion and its application to zirconium alloy development", Taylor, Journal of Nuclear Materials, 184, (1991), pp. 65–77.

*Primary Examiner*—Daniel D. Wasil
*Attorney, Agent, or Firm*—J. S. Beulick

[57] ABSTRACT

A composite nuclear fuel container for service in water cooled nuclear fission reactor plants having improved resistance to corrosion, and a method of producing same. The invention comprises each component of the fuel container being of specific compositions which have been heat treated to transform their microcrystalline structure in such a manner to optimize the corrosion resistance of each component of the fuel container.

10 Claims, 1 Drawing Sheet

COMPOSITE NUCLEAR FUEL CONTAINER AND METHOD FOR PRODUCING SAME

FIELD OF THE INVENTION

This invention relates to composite nuclear fuel containers for service in water cooled nuclear fission reactor plants. The composite nuclear fuel containers of this invention comprise a tubular container consisting of an alloy of zirconium having therein a protective barrier liner consisting of zirconium metal combined with minor amounts of apt metal alloying additives. Similar composite nuclear fuel containers of the prior art are disclosed in U.S. Pat. Nos. 4,200,492, issued Apr. 29, 1980, and No. 4,372,817, issued Feb. 8, 1983.

BACKGROUND OF THE INVENTION

Nuclear fuel containers under certain conditions are subject to leakage failures attributable to corrosion. For example, a destructive type of fuel container corrosion has been identified as fuel pellet-container or cladding interaction stress corrosion cracking, a phenomenon which is primarily induced or accelerated by abrupt or rapid reactor power increases.

Composite nuclear fuel containers or elements have been introduced in the art and used in commercial power generating, water cooled nuclear fission reactors to cope with the problem of stress corrosion cracking. Composite nuclear fuel containers comprise a generally conventional tubular container, constructed of a zirconium alloy, stainless steel, aluminum, or other suitable alloys of the art, provided with an internal lining which functions as a protective barrier. Such linings are composed of a metal having increased resistance to stress corrosion cracking, or other forms of destructive attack. The barrier linings of the art include a variety of metals and alloys, including zirconium metal of substantial purity, for example less than about 5000 parts per million impurities, copper, molybdenum, tungsten, rhenium, niobium and alloys thereof. Examples of such protective metal barrier linings for nuclear fuel tubular containers comprise U.S. Pat. Nos. 4,200,492, issued Apr. 29, 1980; No. 4,372,817, issued Feb. 8, 1983; No. 4,445,942, issued May 1, 1984; No. 4,679,540; issued Apr. 21, 1987; No. 4,942,016, issued Jul. 17, 1990; and No. 4,986,957, issued Jan. 22, 1991.

Typical composite fuel containers for water cooled nuclear reactors comprising a tubular container provided with a metal liner internal barrier metallurgically bonded on to its inner surface, are generally produced by inserting a section of hollow liner stock in close fitting intersurface contact within and throughout the length of a section of tube stock, then forming the metallurgical bond by conventional means. Several methods can be used for metallurgically bonding the tube section to the liner component, including explosive bonding, heating under compression loading to cause diffusion bonding and extrusion of the assembly. Examples of such methods for producing composite constructed nuclear fuel containers are given in U.S. Pat. Nos. 4,200,492, issued Apr. 29, 1980; No. 4,372,817, issued Feb. 8, 1983; and No. 4,390,497, issued Jun. 28, 1983.

This composite assembly of a section of tube stock with the liner stock inserted within the length thereof, is then subjected to a series of circumference reductions with each reduction accompanied by a following heat annealing to reduce any stresses introduced by the compression distortions of the diameter reduction.

In addition to the conventional annealing heat treatments for the purpose of relieving reduction compression induced stresses in the metal crystalline structure of the reduced composite tube and liner unit, it is a common practice to subject nuclear fuel containers to specific heat modifying treatments to enhance or optimize a critical property of the metal such as corrosion resistance or ductility for improving the durability of the container. For example, it is an established practice to heat treat zirconium metal and its alloys, or fuel containers containing same, up to a temperature above the alpha microcrystalline phase of the particular metal composition, or into the beta microcrystalline phase, followed by rapid cooling to impart corrosion resistance. Such recrystallization heat treatments are disclosed in detail in the art, note for example U.S. Pat. Nos. 2,894,866, issued Jul. 14, 1959; No. 4,238,251, issued Dec. 9, 1980; No. 4,390,497, issued Jun. 28, 1983; and No. 4,576,654, issued Mar. 18, 1986.

Heat treatment temperatures for producing the microcrystalline structure changes and accompanying property modifications disclosed in the literature typically depend upon the exact composition of the metal or alloy, and are essentially a unique condition for each different metal or combination of alloying ingredients. Accordingly if the temperature levels to achieve or optimize a particular characteristic in a specific metal composition is not provided in the literature, it can be determined empirically, note for example U.S. Pat. Nos. 2,894,866, issued Jul. 14, 1959; and No. 4,238,251, issued Dec. 9, 1980.

The disclosure and contents of all the aforesaid U.S. patents, and the references cited therein, are incorporated herein by reference.

SUMMARY OF THE INVENTION

This invention comprises a method for producing composite nuclear fuel containers having improved resistance to corrosive attack for service in water cooled nuclear fission reactors, and the corrosion resisting composite nuclear fuel container products of this method. The invention includes providing a protective barrier internal liner for the tubular fuel container which consists of a specific alloys of zirconium, and heat treating the assembled composite nuclear fuel container to transform the microcrystalline structures of the composite fuel container's components to enhance the corrosion resistance of the liner component and to limit interdiffusion of the alloying ingredients of the composite of a zirconium alloy tubular container component and the alloy liner component.

DETAILED DESCRIPTION OF THE INVENTION

This invention comprises a nuclear fuel container or element of a composite construction consisting of a zirconium alloy tubular fuel retainer having an internal protective barrier liner consisting of zirconium alloyed with minor amounts of iron, chromium and/or nickel. The invention additionally comprises a method for producing the composite constructed nuclear fuel container or element including a heat treatment for transforming the microcrystalline structure of the alloy of each component to a higher level of corrosion resistance.

Figure 1:
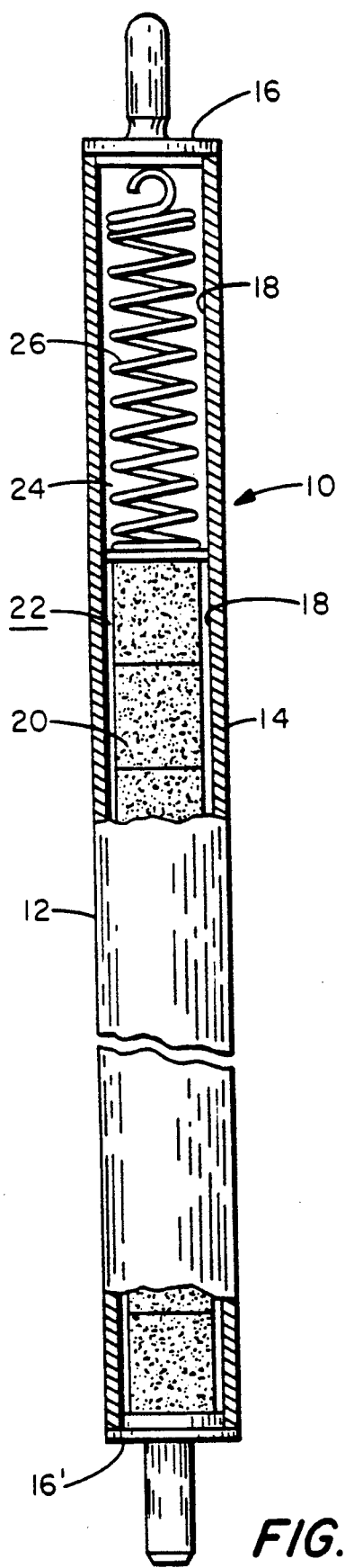
FIG. 1 of the drawing is an elevated or longitudinal view, partly in cross-section, of a nuclear fuel element comprising a composite constructed container or tube housing a column of pellets of nuclear fuel material.

Referring to the drawings, in particular FIG. 1, there is shown a partially cutaway sectional view of composite nuclear fuel element 10. The fuel element 10 comprises an elongated composite fuel container 12 which typically consists of a tube-like body 14 closed at both ends with welded in place upper and lower end plugs 16 and 16' to provide a sealed enclosure. In accordance with a principal aspect of this invention, the composite fuel container 12 consists of a tube 14 of an alloy of zirconium which has been provided with an internal liner 18 of zirconium metal alloyed with iron and chromium and/or nickel which is metallurgically bonded over the inner surface of the zirconium alloy tube 14 substrate. The liner component 18 can be provided in a thickness of from about 5 to about 30 percent of the thickness of the composite constructed tube 12, and preferably greater than 40 micrometers thick.

Housed within the sealed composite fuel container 12, is a core or centrical cylindrical portion of nuclear fuel material 20, here shown as a plurality of fuel pellets of fissionable and/or fertile material stacked in a column. Fuel pellets may be of various shapes such as cylindrical pellets or short rods, and the like.

Figure 2:
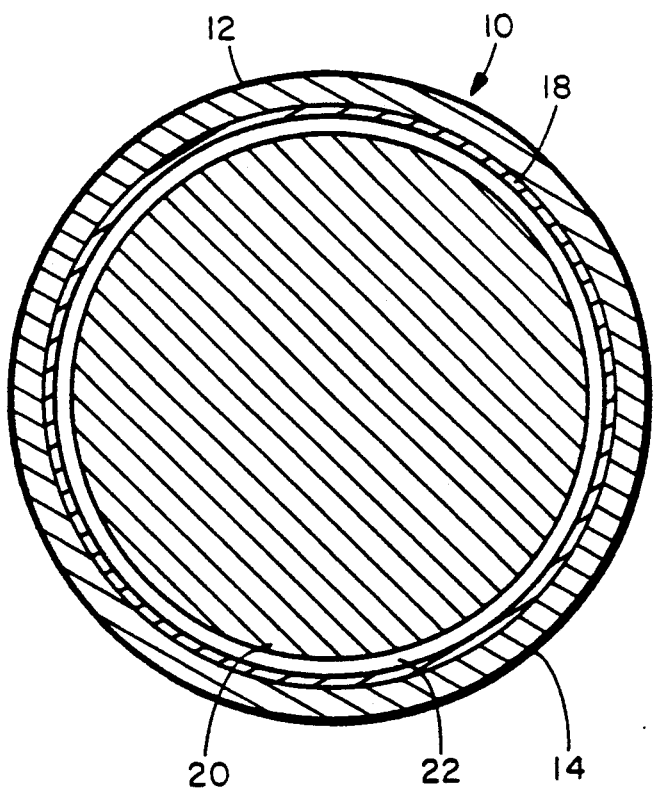
FIG. 2 of the drawing is an enlarge cross-sectional view of the composite fuel container of FIG. 1.

Referring to FIG. 2, the core of fuel material 20 and composite container 12 are typically designed so as to provide a gap illustrated as 22 or void between the inner surface of the composite container 12, including the liner 18, and the outer diameter of the fuel core material 20.

Conventionally the core of fuel material 20 does not occupy the full length of the composite container 12 as shown. The column of pellets forming the fuel core 20 is provided in a length shorter than the composite container 12 whereby there is an end void space or plenum 24 provided. The plenum 24 enables longitudinal expansion of the column of fuel material and serves as an area for the accumulation of gaseous products released from the fuel undergoing fission and irradiation. Preferably retainer means such as a spring 26 is employed positioned within plenum 24 to provide a restraint against the axial movement of the column of fuel, especially during handling and transportation of the fuel element.

Zirconium alloys suitable for the tube-like body 14, or substrate, providing the composite container 12 including those knows in the trade as zircaloy-2 and zircaloy-4. Zircaloy-2 has on a weight basis about 1.5 percent tin; about 0.14 percent iron; about 0.1 percent chromium; and about 0.05 percent nickel, and the balance zirconium. Zircaloy-4 has little or no nickel, but contains slightly more iron than zircaloy-2. Further details regarding these alloys are given in U.S. Pat. Nos. 2,772,969, and No. 3,148,055.

The protective barrier liner component 18, which is metallurgically bonded over the inner surface of the zirconium alloy tube component 14 substrate, comprises zirconium metal alloyed with about 0.1 weight percent of iron and about 0.05 weight percent chromium and/or about 0.04 weight percent nickel. These alloying additives to the zirconium can generally be varied in amounts of +/−50 percent each.

In accordance with this invention, a composite constructed nuclear fuel container consisting of the foregoing described combination of zirconium alloy tube container provided with a protective barrier liner of zirconium metal alloyed with the specified metals and amounts, is subjected to a phase transformation heat treatment to enhance and optimize resistance to corrosion of the metal alloys of the container components, and in particular the metal composition of the liner component. Thus, the composite constructed fuel container of components of the specified metal compositions are subjected to a temperature throughout of at least about 865° C., followed by rapid cooling, such as taught in U.S. Pat. No. 2,894,866, and in related prior art, for example water quenching. Exposed to these thermal conditions, the microcrystalline state of the zirconium alloy tubular container is transformed to an alpha plus-beta-phase while the modified zirconium barrier liner is transformed to the beta phase, and thus a favorable distribution of the alloying constituents formed by the heating is preserved by the rapid cooling from the said phase transforming temperatures of each component. A preferred temperature for the phase transforming treatment comprises about 900° C. Moreover it is significant that the duration of this phase transforming treatment be carried out as briefly as practical to minimize any possible diffusion of oxygen and/or tin from the zirconium alloy of the tubular container to the metal of the barrier liner.

Since, as is known in the art, a gradual cooling from the microcrystalline phase transformation temperature can result in a retrogression back to the original or preheating state, the specific heat treated and transformed product should not be subsequently reheated to the transforming temperatures unless followed by rapid cooling. Thus, subsequent heat treatments such as heat annealing to relieve stresses imposed by mechanical working the metals can be safely carried out at temperatures of about 480° to about 650° C. over a period of approximately one half to 8 hours, and preferably about 577° C., for approximately 2.5 hours.

Typical manufacturing procedures employed in the production of zirconium alloy tubular nuclear fuel containers comprise a series of three or four mechanical circumference reduction steps of tube stock, coupled with subsequent stress relaxing heat annealings for each mechanical reduction, as described in detail in U.S. Pat. No. 4,390,497, cited above. When this procedure is applied in carrying out the subject invention, it is highly desirable that the phase transformation heat treatment for enhancing and optimizing corrosion resistance be applied to the composite of assembled liner component and tubular container component at a stage between the first and last circumference mechanical reduction steps of the composite fuel container, and preferably before the last two of the series of mechanical reductions.

Additionally an apt means for optimizing corrosion resistance in the outer surface of the zirconium alloy tubular container component of the composite fuel container through heat induced microcrystalline transformation, while providing for optimum properties within the liner component of the composite, comprises heat treating the outer surface portion of the tubular container of the composite to a different or higher temperature level for microcrystalline phase transformation than encountered by the internal liner component by utilizing the process of U.S. Pat. No. 4,576,754, cited above.

What is claimed is:

1. A method for producing composite nuclear fuel containers for service in water cooled nuclear fission reactors, comprising the steps of:

assembling a protective barrier internal liner consisting of zirconium metal alloyed with about 0.1 weight percent of iron and at least one metal selected from about 0.05 chromium and about 0.04 nickel weight percent in close fitting relationship within and metallurgically bonded to a tubular container consisting of an alloy of zirconium; and heating said assembly of the tubular container with the protective barrier internal liner therein up to a temperature of at least about 865° C. and thereby transforming the microcrystalline structure of the zirconium alloy tubular container to an alpha and beta phase while transforming the microcrystalline structure of the zirconium internal liner to a beta phase, followed by rapid cooling the tubular container down from the alpha plus beta phase field and the liner down from the beta phase field.

2. The method for producing composite nuclear fuel containers for service in water cooled nuclear fission reactors of claim 1, wherein the assembly of the tubular container with the protective barrier internal liner therein is heated to a temperature of approximately 900° C.

3. The method for producing composite nuclear fuel containers for service in water cooled nuclear fission reactors of claim 2, wherein the protective barrier internal liner of the assembly consists of zirconium metal alloyed with about 0.1 iron and about 0.05 chromium weight percent.

4. The method for producing composite nuclear fuel containers for service in water cooled nuclear fission reactors of claim 2, wherein protective barrier internal liner of the assembly consists of zirconium metal alloyed with about 0.1 iron and about 0.04 nickel weight percent.

5. The method for producing composite nuclear fuel containers for service in water cooled nuclear fission reactors of claim 1, wherein the assembly and heat treated composite nuclear fuel containers are reduced in diameter and heat annealed at temperatures of about 480° to about 650° C. to relieve stresses.

6. A composite nuclear fuel container for service in water cooled nuclear fission reactors comprising: a tubular container consisting of an alloy of zirconium and having an internal liner providing an inner protective barrier consisting of zirconium metal alloyed with about 0.1 weight percent iron and at least one metal selected from about 0.05 chromium and about 0.04 nickel weight percent, said zirconium alloy tubular container having been rapidly cooled from an alpha plus beta phase microcrystalline structure and said zirconium internal lining having been rapidly cooled from a beta phase microcrystalline structure.

7. The composite nuclear fuel container for service in water cooled nuclear fission reactors of claim 6, wherein the protective barrier internal liner of the fuel container consists of zirconium metal alloyed with about 0.1 iron and about 0.05 chromium weight percent.

8. The composite nuclear fuel container for service in water cooled nuclear fission reactors of claim 6, wherein the protective barrier internal liner of the fuel container consists of zirconium metal alloyed with about 0.1 iron and about 0.04 nickel weight percent.

9. The composite nuclear fuel container for service in water cooled nuclear fission reactors of claim 6, wherein the protective barrier internal liner within the tubular container is metallurgically bonded to the inner surface of the tubular container.

10. A composite nuclear fuel container for service in water cooled nuclear fission reactors comprising: a tubular container consisting of an alloy of zirconium and having an internal liner providing an inner protective barrier consisting of zirconium metal alloyed with about 0.1 weight percent of iron, about 0.05 weight percent of chromium and about 0.04 weight percent of nickel, said zirconium alloy tubular container having been rapidly cooled from an alpha plus beta phase microcrystalline structure and said zirconium internal lining having been rapidly cooled from a beta phase microcrystalline structure.

* * * * *